June 27, 1967  C. L. SMITH  3,327,473

ENGINE SUPPORT STRUCTURE

Filed Jan. 11, 1966

INVENTOR.
Clayton L. Smith
BY
F. J. Fodale
ATTORNEY

United States Patent Office 3,327,473
Patented June 27, 1967

3,327,473
ENGINE SUPPORT STRUCTURE
Clayton L. Smith, Plainfield, Ind., assignor to General Motors Corporation, Detroit, Mich., a corporation of Delaware
Filed Jan. 11, 1966, Ser. No. 519,857
10 Claims. (Cl. 60—39.31)

My invention relates generally to a gas turbine engine and more particularly to the support structure between the outer casing and the rotating parts of the gas turbine engine.

Heretofore, such support structure consisted of two, three and sometimes four spiders extending inwardly from the engine casing to provide bearing mounts for the rotating engine parts. Often, at least some of these spiders were located in the hot sections of the engine introducing the problems associated with differential thermal expansion. In the case where more than two spiders were required, support structure was usually located in the gas flow path at the compressor inlet and/or at the turbine outlet resulting in a decrease in engine performance. Also, it is usually necessary to locate the engine mounting pads for aircraft installation at the spider locations.

It is the object of my invention to provide a support structure between a gas turbine casing and the rotating parts of the engine which minimizes decreased engine performance due to support structure, gas flow interference, and also minimizes thermal expansion problems, while providing suitable mounting pad location for aircraft installation. This I have generally accomplished by providing as the sole support a single structure which is located within the combustor section, but external to the burners where the gas flow is not appreciably affected, where it is relatively cool and where it is capable of providing aircraft installation mounting pads at or near the engine center of gravity.

My support structure also provides weight savings over prior art structures; weight savings generally being an object of all gas turbine engine component design.

Other objects and advantages of the invention will hereinafter become more fully apparent from the following description of the annexed drawings, which illustrate a preferred embodiment, and wherein.

Figure 1:
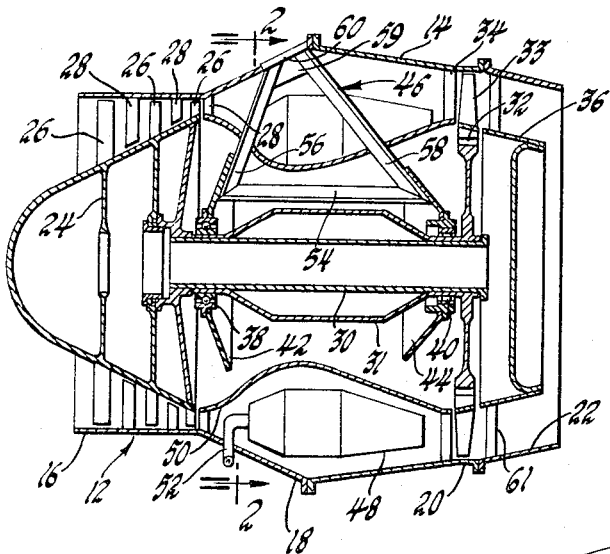
FIGURE 1 is a schematic section taken along the longitudinal axis of a typical gas turbine engine employing a support structure in accordance with my invention.

Referring now to the drawings, and more particularly to FIGURE 1, I have shown a gas turbine engine indicated generally at 12. The gas turbine engine 12 has an outer generally cylindrical casing 14 with a compressor section 16, combustor section 18, turbine section 20, and exhaust section 22 in axial alignment. The compressor section 16 includes a rotatably mounted axial flow compressor 24 having a number of blade rows 26 with stator vane rows 28 extending from the casing 14 disposed therebetween. The combustor section 18 is of the type which has a number of circumferentially spaced combustor cans 48. The combustion section could utilize a modified annular combustor or a three sector annular combustor. Fuel nozzles 52 mounted on the casing 14 extend into each combustor can. A drive shaft 30 coaxial with the casing 14 extends from the compressor 24 through the combustor section 18 and is secured to a turbine wheel 32 at its downstream end. The turbine wheel has a blade row 33 mounted on its periphery and a stationary nozzle vane row 34 is provided upstream of the turbine blade row 33. As illustrated, the stationary exhaust nozzle cone 36 is supported by the anti-swirl vanes 61.

The shaft 30 is radially supported within the casing 14 by a pair of spaced bearings 38 and 40. It may include a bulged central portion 31 to increase the critical speed of the shaft beyond the operating range of the engine. The bearing supports 42 and 44 for the bearings 38 and 40, respectively, are frusto-conical sections which may be inclined toward the center of the engine. The bearing supports in turn are supported by a number of circumferentially spaced struts 46 which extend radially between the combustor cans 48 and are attached to the casing 14. The combustor inner case 50 is supported from the struts 46 or from the upstream compressor vane ring and the downstream turbine nozzle vane ring.

Figure 2:
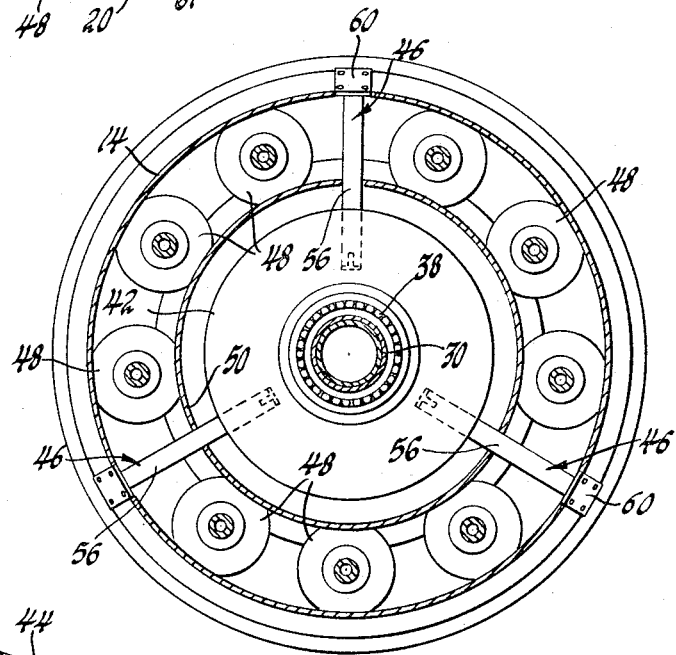
FIGURE 2 is a section taken substantially along the line 2—2 of FIGURE 1 and looking in the direction of the arrows.
Figure 3:
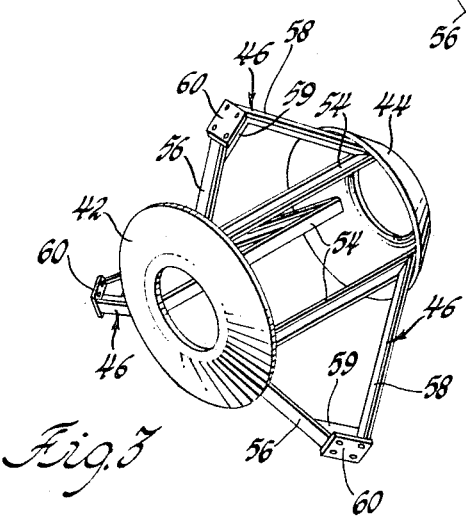
FIGURE 3 is a perspective view of the support structure in accordance with my invention.

As illustrated, I have shown three axially circumferentially spaced struts 46. This is best shown in FIGURES 2 and 3. Each strut 46 is a four member truss comprising an axial member 54 which spans the forward and aft bearing supports 42 and 44. Radial members 56 and 58 extend from the opposite ends of the member 54 and are joined at their radially outer ends by a gusset plate 59. Members 54, 56 and 58 are T-shaped beams. A mounting pad 60 mounted on the fourth member or gusset plate 59 completes its T-shaped cross section. The mounting pad 60 extends through the compressor casing so as to provide suitable mounting means for aircraft installation. The gusset plate 59 and mounting pads 60 are of minimum practical length so that the four member trusses approximate the load carrying characteristics of a triangle. The length, however, must be sufficient to provide suitable space for aircraft installation. The struts 46 as thus described provide the sole supporting structure between the casing 14 and the rotating parts of the gas turbine engine 12 which is the compressor 24, drive shaft 30, and turbine 32. The struts 46 are located in the combustor section between the combustor cans 48 in the bypass air stream where their obstruction to the gas flow has minimum effect and where it is relatively cool, thus minimizing thermal expansion problems. The struts 46 also include aircraft installation pads 60. The members 56 and 58 can be designed so that the mounting pads 60 lie in a plane in the approximate vicinity of the longitudinal center of gravity of the gas turbine engine. Thus I have provided a support structure which accomplishes the objects as set forth in the introduction.

Various modifications are contemplated and may obviously be resorted to by those skilled in the art without departing from the spirit and scope of the invention, as hereinafter defined by the appended claims, as only a preferred embodiment thereof has been disclosed.

I claim:

1. Support structure for a gas turbine engine having a generally cylindrical casing with a compressor and turbine rotatably mounted therein, the compressor and turbine being axially spaced and drivingly connected by a shaft in a combustor section between the compressor and the turbine enclosing the shaft, said combustor section including a plurality of combustors therein, comprising, in combination, first shaft bearing support means disposed adjacent the downstream end of said compressor, second shaft bearing support means adjacent the upstream end of said turbine, a plurality of struts extending axially between and secured to said first and second bearing support means, said struts extending radially between said combustors and being secured to said casing to provide the sole support between said casing and said compressor, shaft and turbine.

2. The support structure as defined in claim 1 wherein said struts are equally circumferentially spaced.

3. The support structure as defined in claim 2 wherein said struts have a quadrilateral configuration.

4. The support structure as defined in claim 3 wherein the radially outermost side of said quadrilateral struts which are secured to said casing is of minimum practical length to approximate the load carrying characteristics of a triangle.

5. The support structure as defined in claim 3 wherein each of said struts consist of our member trusses; said four members being an axial member extending between said first and second shaft bearing support means, two members extending radially from the respective ends of said first member and a fourth member bridging the radially outer ends of said two members and secured to said casing.

6. The support structure as defined in claim 5 wherein said fourth member is of minimum practical length to approximate the load carrying characteristics of a triangle.

7. The support structure as defined in claim 6 wherein said bearing support means are frsuto-conical sections and are secured to said two members, respectively.

8. The support structure as defined in claim 6 including mounting means for said engine, said mounting means being secured to said casing at the points where said fourth members are secured to said casing.

9. The support structure as defined in claim 6 wherein there are three equally circumferentially spaced struts.

10. The support structure as defined in claim 9 wherein said bearing support means are frusto-conical sections and are secured to said two members, respectively, said support structure further including mounting means for said engine, said mounting means being secured to said casing at the points where said fourth members are secured to said casing.

References Cited

UNITED STATES PATENTS

| | | | |
|---|---|---|---|
| 2,410,450 | 11/1946 | Kroon | 60—39.37 |
| 2,529,958 | 11/1950 | Owner et al. | 60—39.31 |
| 2,591,399 | 4/1952 | Buckland et al. | 60—39.31 |

CARLTON R. CROYLE, *Primary Examiner.*